United States Patent
Lin

(10) Patent No.: US 7,683,557 B2
(45) Date of Patent: Mar. 23, 2010

(54) INTERLOCKING DEVICE FOR CONTROLLING CLOCKWISE AND COUNTERCLOCKWISE ROTATION OF A MOTOR

(75) Inventor: Tai-Hung Lin, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 277 days.

(21) Appl. No.: 11/957,399

(22) Filed: Dec. 14, 2007

(65) Prior Publication Data

US 2009/0153082 A1    Jun. 18, 2009

(51) Int. Cl.
*H02P 1/22* (2006.01)
(52) U.S. Cl. .................. 318/291; 318/280; 318/283; 318/293
(58) Field of Classification Search ......... 318/280–283, 318/291–293
See application file for complete search history.

(56) References Cited

U.S. PATENT DOCUMENTS 6,841,955 B2 *   1/2005   Zhou et al. .............. 318/112

* cited by examiner

*Primary Examiner*—Paul Ip
(74) *Attorney, Agent, or Firm*—Banger Shia

(57) ABSTRACT

An interlocking device for controlling clockwise and counterclockwise rotation of a motor is connected with a clockwise rotation module and a counterclockwise rotation module at both ends thereof to form a loop by cooperating with a power-supply terminal and an earth terminal. The clockwise rotation module includes a clockwise rotation trigger switch and a clockwise rotation relay. The counterclockwise rotation module includes a counterclockwise rotation trigger switch and a counterclockwise rotation relay. By such arrangements, the loop collision caused by mis-touch can be avoided by a cross connection of the clockwise and counterclockwise rotation relays with the clockwise and counterclockwise rotation trigger switches, thus preventing the man-made careless mistake and maintaining the smoothness of the operation.

9 Claims, 7 Drawing Sheets

INTERLOCKING DEVICE FOR CONTROLLING CLOCKWISE AND COUNTERCLOCKWISE ROTATION OF A MOTOR

BACKGROUND OF THE INVENTION

1. Field of the Invention

The present invention relates to an interlocking device, and more particularly to an interlocking device for controlling clockwise and counterclockwise rotation of a motor.

2. Description of the Prior Art

With the rapid development of the technology, the manual operating manner is gradually replaced by the automatic production flow, which can be most commonly seen in the automatic control of the positive and negative rotation of the motor. Referring to FIG. 1, a clockwise and counterclockwise rotation circuit 160 for a motor was developed on the market. The clockwise and counterclockwise rotation circuit 10 for a motor comprises a clockwise rotation switch 11, a clockwise rotation relay 12, a counterclockwise rotation switch 13, a counterclockwise relay 14, a power-supply circuit 15, a time delay circuit 16, a delay switch 17 and a motor 18. With further analysis, the abovementioned circuit still has the following problems:

1. The clockwise and counterclockwise rotation circuit 10 for a motor doesn't offer a clockwise and counterclockwise rotation interlocking function, when the clockwise rotation switch 11 and the counterclockwise rotation switch 13 of the clockwise and counterclockwise rotation circuit 10 for a motor are synchronously pressed, the motor 18 will immediately stop, and when in use, if the clockwise rotation switch 11 or the counterclockwise rotation switch 13 is pressed accidentally, it will cause an undesired rotation. Thereby, the man-made carelessness and the incertitude of the prevention will hamper the production and affect the production efficiency; and 2. If the motor needs to add the interlocking function, it is necessary to additionally increase the manpower cost to redesign the circuit and waste time to test the reliability of the redesigned circuit, thus increasing the cost and reducing the competitive power.

In order to solve the abovementioned relevant problems, based on the accumulative research technology and experiences in the field of the interlocking device, after numerous tests and multiple try ways, the applicant of the present invention has developed an interlocking device for controlling motor clockwise and counterclockwise rotation.

SUMMARY OF THE INVENTION

The primary objective of the present invention is to provide an interlocking device for controlling clockwise and counterclockwise rotation of a motor to make the clockwise rotation module and the counterclockwise rotation module restrict each other to act synchronously.

In order to achieve the abovementioned objective, the present invention comprises a power-supply terminal, an earth terminal, a clockwise rotation module including a clockwise rotation trigger switch and a clockwise rotation relay, a counterclockwise rotation module including a counterclockwise rotation trigger switch and a counterclockwise rotation relay, and a motor. By such arrangements, during the clockwise rotation, the interlocking device utilizes the clockwise rotation relay of the clockwise rotation module to prevent the counterclockwise rotation trigger switch of the counterclockwise rotation module from acting, thus opening the counterclockwise rotation loop of the counterclockwise rotation module. Moreover, during the counterclockwise rotation of the motor, the interlocking device utilizes the counterclockwise rotation relay of the counterclockwise rotation module to prevent the clockwise rotation trigger switch of the clockwise rotation module from acting, thus opening the counterclockwise rotation loop of the counterclockwise rotation module. Under the interlocking condition of the circuit, if one loop is put into the action, the other loop is unable to act, so that the loop collision caused by mis-touch is avoided during the rotation of the motor, thus offering the following advantages:

1. Making the user assuredly control the operation state, preventing the man-made careless mistake, and synchronously enhancing the manufacturing smoothness and production efficiency;

2. Avoiding the occurrence of the loop collision and the short circuit, so as to prolong the service life of the motor 70, thus enhancing the reliability of the product.

The second objective of the present invention is that the clockwise and counterclockwise rotation relays are connected with a diode respectively to help wasting energy and avoid an excessive energy input.

In order to achieve the abovementioned objective, the interlocking device of the present invention electrifies the coil of the clockwise rotation relay during the clockwise rotation, and electrifies the coil of the counterclockwise rotation relay during the clockwise rotation. By such arrangements, the coil of the clockwise rotation relay and the coil of the counterclockwise rotation relay can utilize the diodes to waste the energy, thus avoiding being damaged and prolonging the service life of the clockwise rotation relay of the clockwise rotation module and the counterclockwise rotation relay of the counterclockwise rotation module.

The third objective of the prevent invention is to utilize the power-supply delay circuit to perform the delayed protection on the clockwise rotation relay of the clockwise rotation module and the counterclockwise rotation relay of the counterclockwise rotation module, respectively.

In order to achieve the above objective, the power-supply delay circuit of the interlocking device will receive the power from the clockwise rotation trigger switch of the clockwise rotation module during the clockwise rotation, and will receive the power from the counterclockwise rotation trigger switch of the counterclockwise rotation module during the counterclockwise rotation. By such arrangements, the interlocking device can utilize the delay switch to receive the delayed power from the power-supply delay circuit to cause a delayed operation, so as to provide the protection to the clockwise rotation relay of the clockwise rotation module and the counterclockwise rotation relay of the counterclockwise rotation module, respectively.

DETAILED DESCRIPTION OF THE PREFERRED EMBODIMENTS

Figure 1:
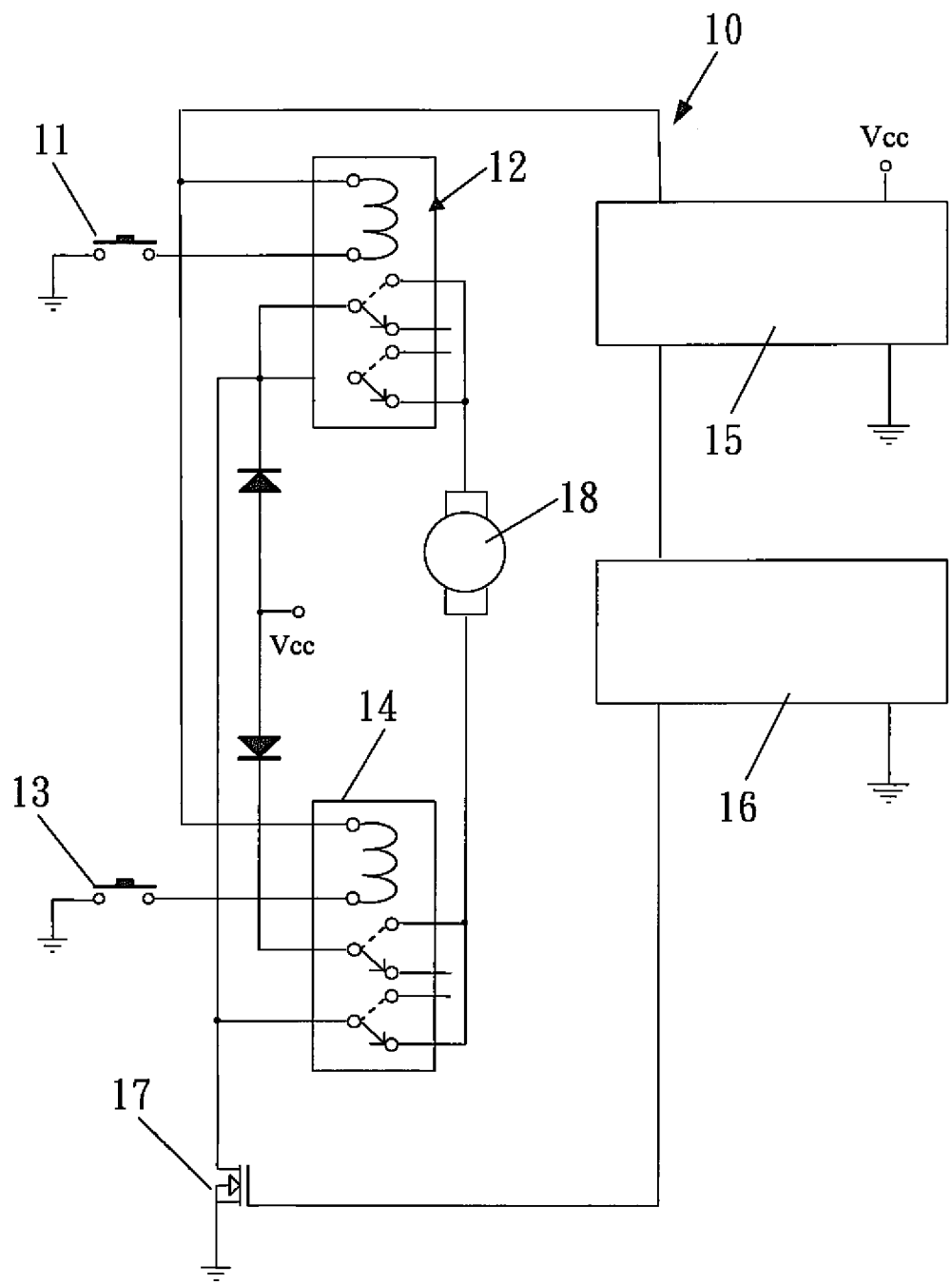
FIG. 1 is a schematic diagram of a conventional clockwise and counterclockwise rotation circuit for a motor.

The present invention will be clearer from the following description when viewed together with the accompanying drawings, which show, for purpose of illustrations only, the preferred embodiment in accordance with the present invention.

Referring to FIGS. 2-5, an interlocking device 20 for a motor in accordance with the present invention comprises a power supply terminal 30, an earth terminal 40, a clockwise rotation module 50, a counterclockwise rotation module 60, a motor 70, a power-supply delay circuit 80 and a delay switch 90.

The clockwise rotation module 50 includes a clockwise rotation switch 51, a clockwise rotation trigger switch 52 and a clockwise rotation relay 53. One end of the clockwise rotation switch 51 is connected to the earth terminal 40, and the other end of the clockwise rotation switch 51 is connected to the power-supply terminal 30. The clockwise rotation trigger switch 52 is a bipolar junction transistor and includes a pole B, a pole E and a pole C, and the pole B is connected to the power-supply terminal 30. The clockwise rotation relay 53 includes a coil 54, a first switch element 55 and a second switch element 56. One end of the coil 54 is connected to the pole E of the clockwise rotation trigger switch 52, and the other end of the coil 54 is connected to the earth terminal 40. The first switch element 55 includes a contact a, a contact b and a contact c. The contact a of the first switch element 55 is connected to the earth terminal 40, but the contact b of the first switch element 55 is not used herein. The second switch element 56 includes a contact a, a contact b and a contact c. The contact a of the second switch element 56 is connected to the power-supply terminal 30, and the contact b of the second switch element 56 is connected to the contact c of the first switch element 55.

The counterclockwise rotation module 60 includes a counterclockwise rotation switch 61, a counterclockwise rotation trigger switch 62, and a counterclockwise rotation relay 63. One end of the counterclockwise rotation switch 61 is connected to the earth terminal 40, and the other end of the counterclockwise rotation switch 61 is connected to the power-supply terminal 30. The counterclockwise rotation trigger switch 62 is a bipolar junction transistor and includes a pole B, a pole E and a pole C. The pole B of the counterclockwise rotation trigger switch 62 is connected to the power-supply terminal 30. The counterclockwise rotation relay 63 includes a coil 64, a first switch element 65 and a second switch element 66. One end of the coil 64 is connected to the pole E of the counterclockwise rotation trigger switch 62, and the other end of the coil 64 is connected to the earth terminal 40. The first switch element 65 includes a contact a, a contact b and a contact c, and the contact a of the first switch element 65 is connected to the earth terminal 40, but the contact c of the first switch element 65 is not used herein. The second switch element 66 includes a contact a, a contact b, and a contact c. The contact a of the second switch element 66 is connected to the power-supply terminal 30, and the contact b of the second switch element 66 is connected to the pole C of the clockwise rotation trigger switch 52, and the contact c is connected to the contact b of the first switch element 65.

The motor 70 includes a first terminal 71 and a second terminal 72. The first terminal 71 of the motor 70 is connected to the contact c of the first switch element 55 of the clockwise rotation relay 53 and the contact b of the second switch element 56 of the clockwise rotation relay 53, respectively. The second terminal 72 of the motor 70 is connected to the contact b of the first switch element 65 of the counterclockwise rotation relay 63 and the contact c of the second switch element 66 of the counterclockwise rotation relay 63, respectively.

Further, as for the interlocking device 20, the coil 54 of the clockwise rotation relay 53 of the clockwise rotation module 50 is connected with a diode 57 in parallel, and the coil 64 of the counterclockwise rotation relay 63 of the counterclockwise rotation module 60 is connected with a diode 67 in parallel.

The interlocking device 20 further includes a power-supply delay circuit 80 and a delay switch 90. The power-supply delay circuit 80 is connected to the pole E of the clockwise rotation trigger switch 52 of the clockwise rotation module 50 and the pole E of the counterclockwise rotation trigger switch 62 of the counterclockwise rotation module 60, respectively. The delay switch 90 is a metal oxide semiconductor field-effect transistor and includes a pole D, a pole G and a pole S. The pole D of the delay switch 90 is connected to the contact a of the first switch element 55 of the clockwise rotation module 50 and the contact a of the first switch element 65 of the counterclockwise rotation module 60, respectively. The pole S of the delay switch 90 is connected to the earth terminal 40, and the pole G of the delay switch 90 is connected to the power-supply delay circuit 80.

The aforementioned is the summary of the positional and structural relationship of the respective components of the preferred embodiment in accordance with the present invention.

For a better understanding of the present invention, its operation and function, reference should be made to FIGS. 2-7:

The following description is based on two states: A. the clockwise rotation is on and the counterclockwise rotation is off; and B. the counterclockwise rotation is on and the clockwise rotation is off.

Figure 2:
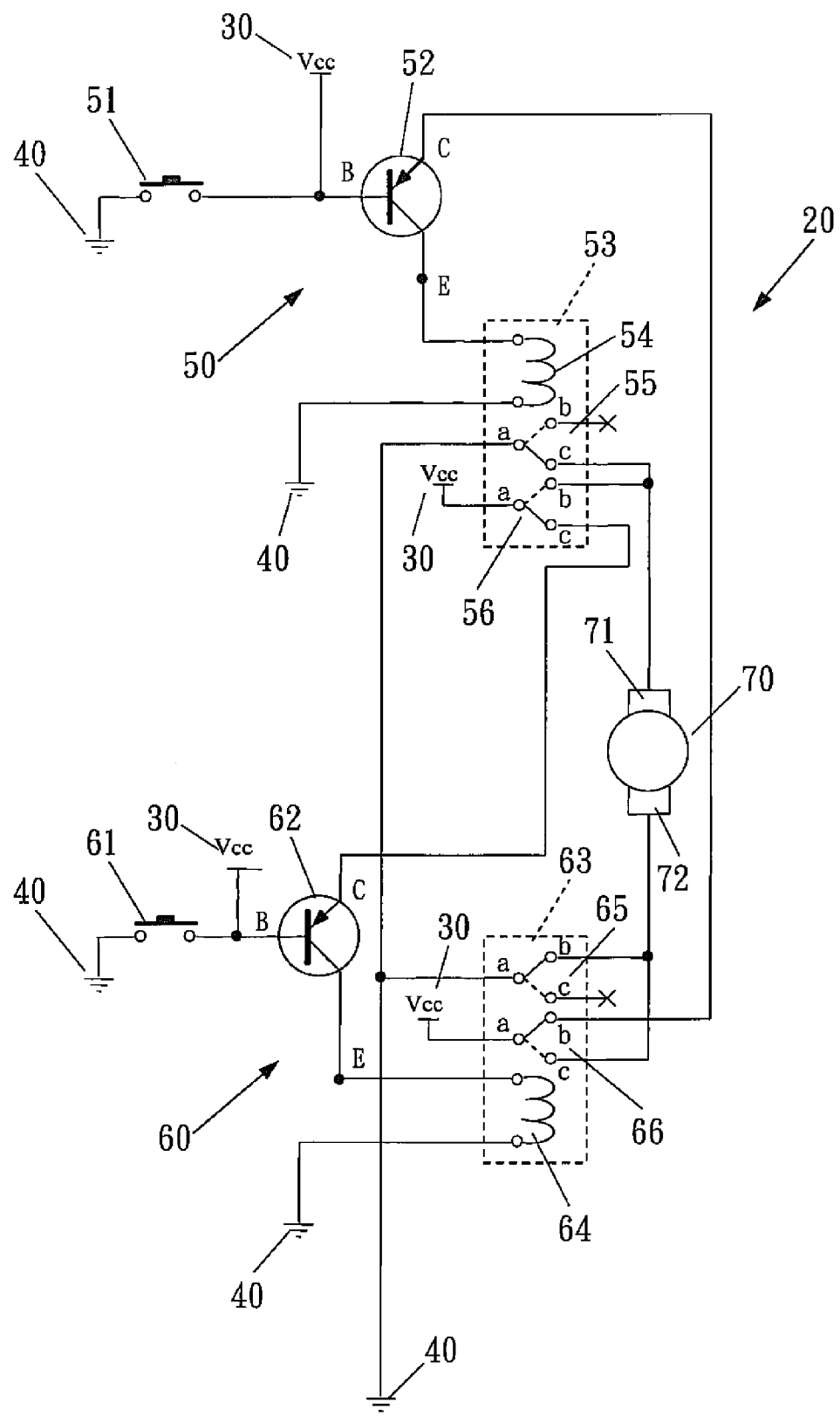
FIG. 2 is a circuit diagram of an interlocking device in accordance with the present invention.
Figure 3:
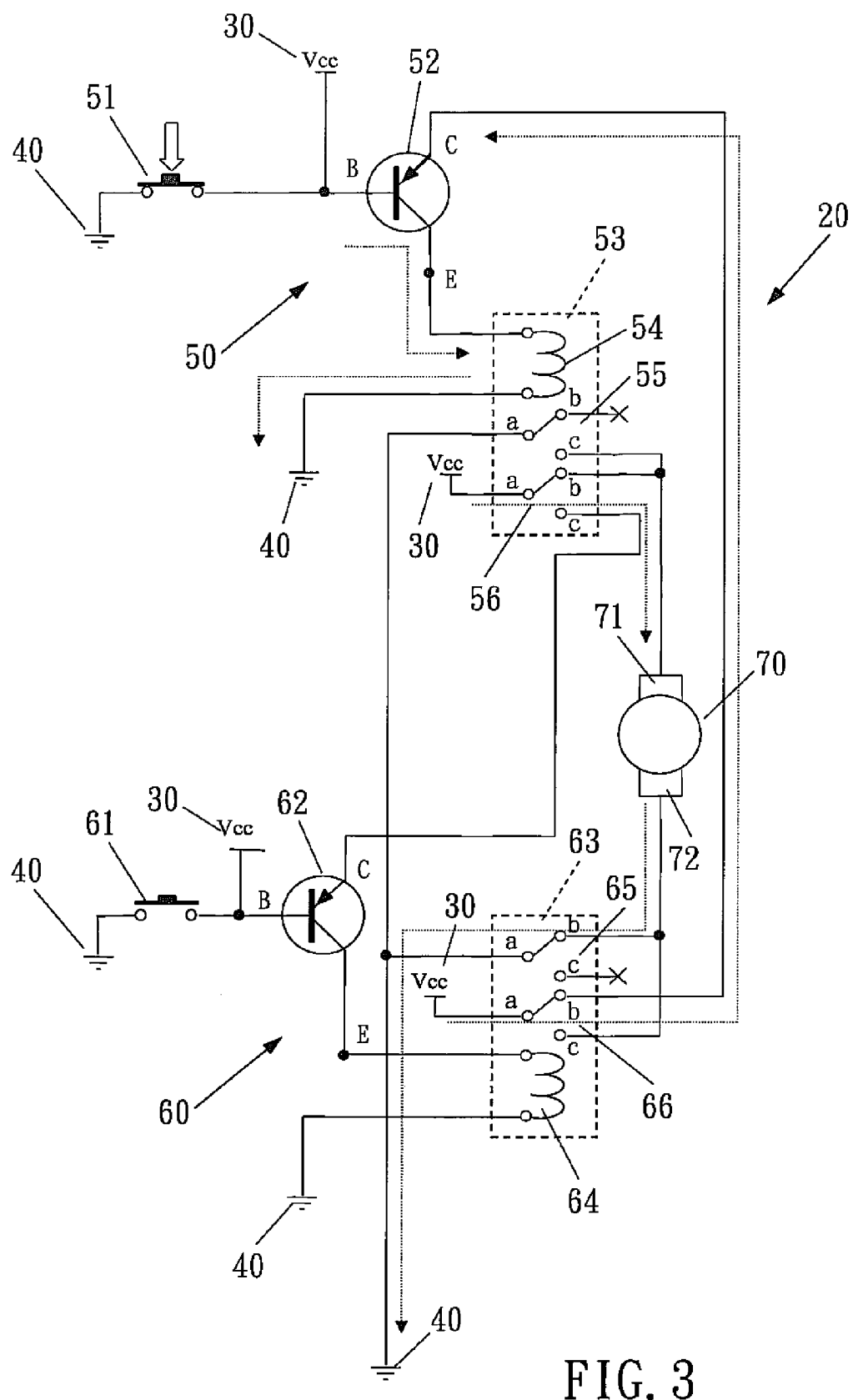
FIG. 3 is a circuit diagram of the interlocking device is operated in the clockwise rotation state in accordance with the present invention.

A. the clockwise rotation is on and the counterclockwise rotation is off: The power is transmitted from the power-supply terminal 30 (as shown in FIGS. 2-3) and through the earth terminal 40, so as to form a power-supply loop. The second switch element 66 of the counterclockwise rotation module 60 will turn on the clockwise rotation trigger switch 52 by transmitting the power of the power-supply terminal 30 through the contact a and the contact b, so when the clockwise rotation switch 51 of the clockwise rotation module 50 is turned on, the power of the power-supply terminal 30 utilizes the clockwise rotation switch 52 to turn on the coil 54 of the clockwise rotation relay 53, so as to switch the first switch element 55 and the second switch element 56, so that the power of the power-supply terminal 30 is transmitted from the power-supply terminal 30 through the contacts a, b of the second switch element 56, the first terminal 71 and the second terminal 72 of the motor 70, and the contacts b, a of the first switch element 65 of the counterclockwise rotation relay 63 to the earth terminal 40, thus forming a clockwise rotation loop. Additionally, the counterclockwise rotation trigger switch 62 of the counterclockwise rotation module 60 is cut off the power supply by the clockwise rotation relay 53 of the clockwise rotation module 50, so the trigger power cannot be received to turn on the counterclockwise rotation trigger switch 62. Thereby, if counterclockwise rotation switch 61 of the counterclockwise rotation module 60 is pressed, the counterclockwise rotation of the motor 70 will not be started. The power of the power-supply terminal 30 is continuously transmitted into the first terminal 71 of the motor 70, and then transmitted out of the second terminal 72 of the motor 70, so as to maintain the clockwise rotation of the motor 70. Closing the clockwise rotation switch 51 can stop the clockwise rotation of the motor 70.

Figure 4:
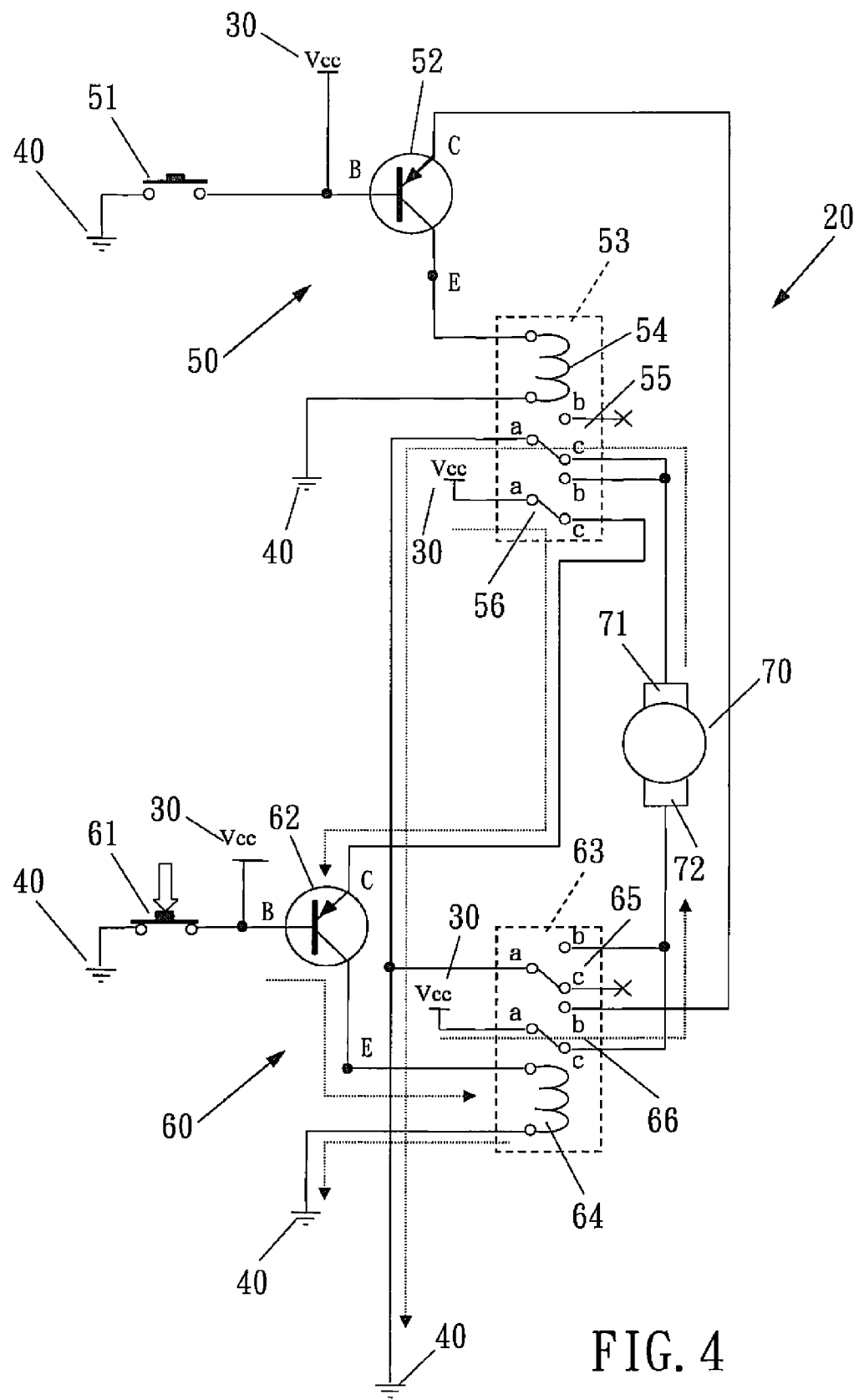
FIG. 4 is a circuit diagram of the interlocking device is operated in the counterclockwise rotation state in accordance with the present invention.

B. The counterclockwise rotation is on and the clockwise rotation is off.: The power is transmitted from the power-supply terminal 30 (as shown in FIGS. 2-4) to the earth terminal 40, so as to form a power-supply loop. The second switch element 56 of the clockwise rotation module 50 will turn on the counterclockwise rotation trigger switch 62 by transmitting the power of the power-supply terminal 30 through the contact a and the contact b, so when the counterclockwise rotation switch 61 of the counterclockwise rotation module 60 is turned on, the power of the power-supply terminal 30 is transmitted through the counterclockwise rotation switch 62 to electrify the coil 64 of the counterclockwise rotation relay 63, so as to switch the first switch element 65 and the second switch element 66, so that the power of the power-supply terminal 30 is transmitted from the power-supply terminal 30 through the contacts a, b of the second switch element 66, the second terminal 72 and the first terminal 71 of the motor 70, and the contacts c, a of the first switch element 55 of the clockwise rotation relay 53 to the earth terminal 40, thus forming a counterclockwise rotation loop. Additionally, the clockwise rotation trigger switch 52 of the clockwise rotation module 50 is cut off the power supply by the counterclockwise rotation relay 63 of the counterclockwise rotation module 60, so the trigger power cannot be received to turn on the clockwise rotation trigger switch 52. Thereby, if the clockwise rotation switch 51 of the clockwise rotation module 50 is pressed, the clockwise rotation of the motor 70 will not be started. The power of the power-supply terminal 30 is continuously transmitted into the second terminal 72 of the motor 70, and then transmitted out of the first terminal 71 of the motor 70, so as to maintain the counterclockwise rotation of the motor 70. Closing the counterclockwise rotation switch 61 can stop the counterclockwise rotation of the motor 70.

Hence, during the clockwise rotation of the motor 70, with the clockwise rotation relay 53, the interlocking device 20 is controlled to be turned on/off by the clockwise rotation switch 51, so as to prevent the counterclockwise rotation trigger switch 62 of the counterclockwise rotation module 60 from acting, thus opening the counterclockwise rotation loop of the counterclockwise rotation module 60. Moreover, during the counterclockwise rotation of the motor 70, with the counterclockwise rotation relay 63, the interlocking device 20 is controlled to be turned on/off by the counterclockwise rotation switch 61, so as to prevent the clockwise rotation trigger switch 52 of the clockwise rotation module 50 from acting, thus opening the clockwise rotation loop of the clockwise rotation module 50. Under the interlocking condition of the circuit, if one loop is put into action, the other loop is unable to act, so that the loop collision caused by mis-touch is avoided during the rotation of the motor 70, thus offering the following advantages:

1. Making the user assuredly control the operation state, preventing the man-made careless mistake, and synchronously enhancing the manufacturing smoothness and production efficiency; and 2. Avoiding the occurrence of the loop collision and the short circuit, so as to prolong the service life of the motor 70, thus enhancing the reliability of the product.

Figure 5:
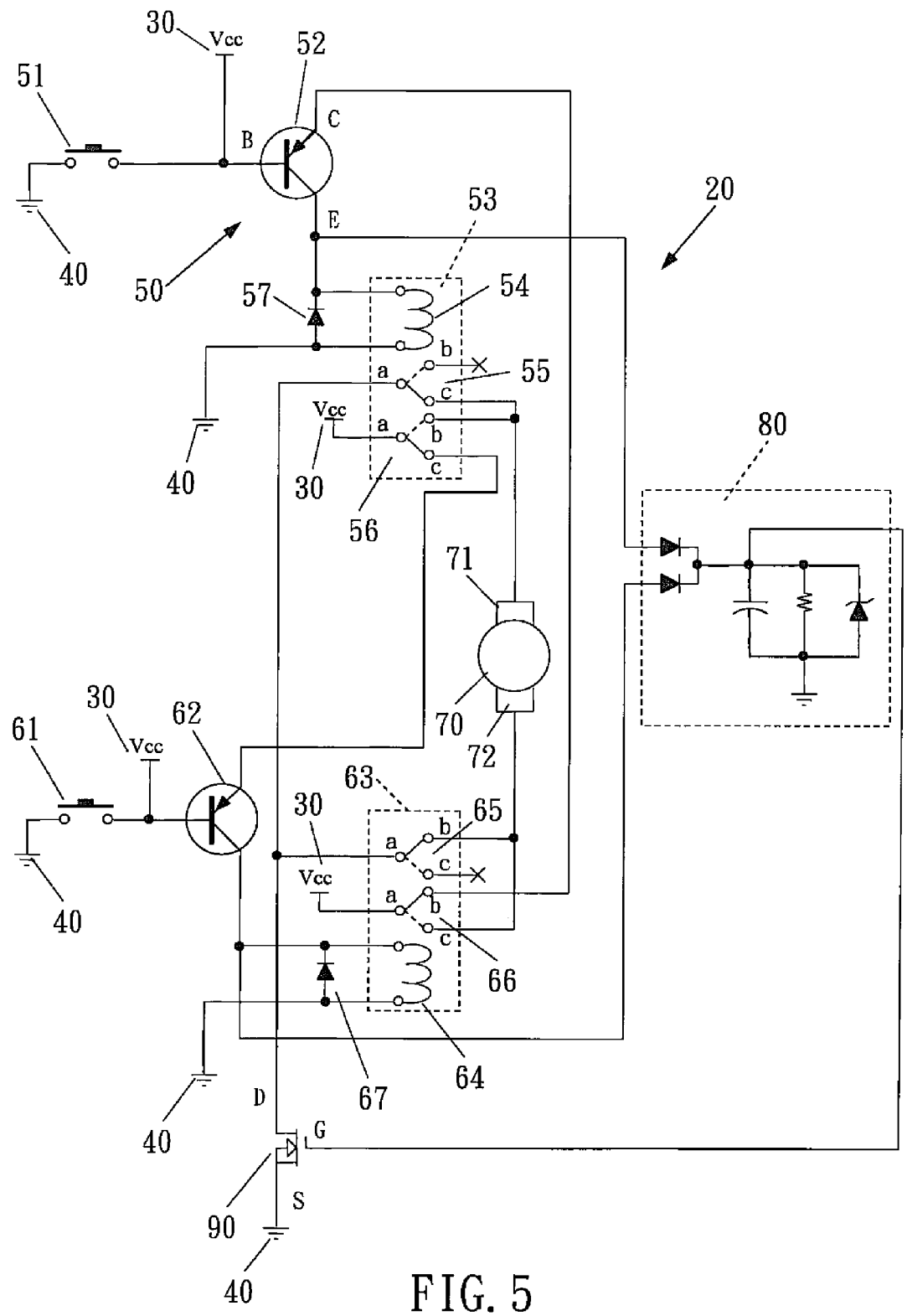
FIG. 5 is a circuit diagram of the interlocking device is used together with a power-supply delay circuit and a delay switch in accordance with the present invention.
Figure 6:
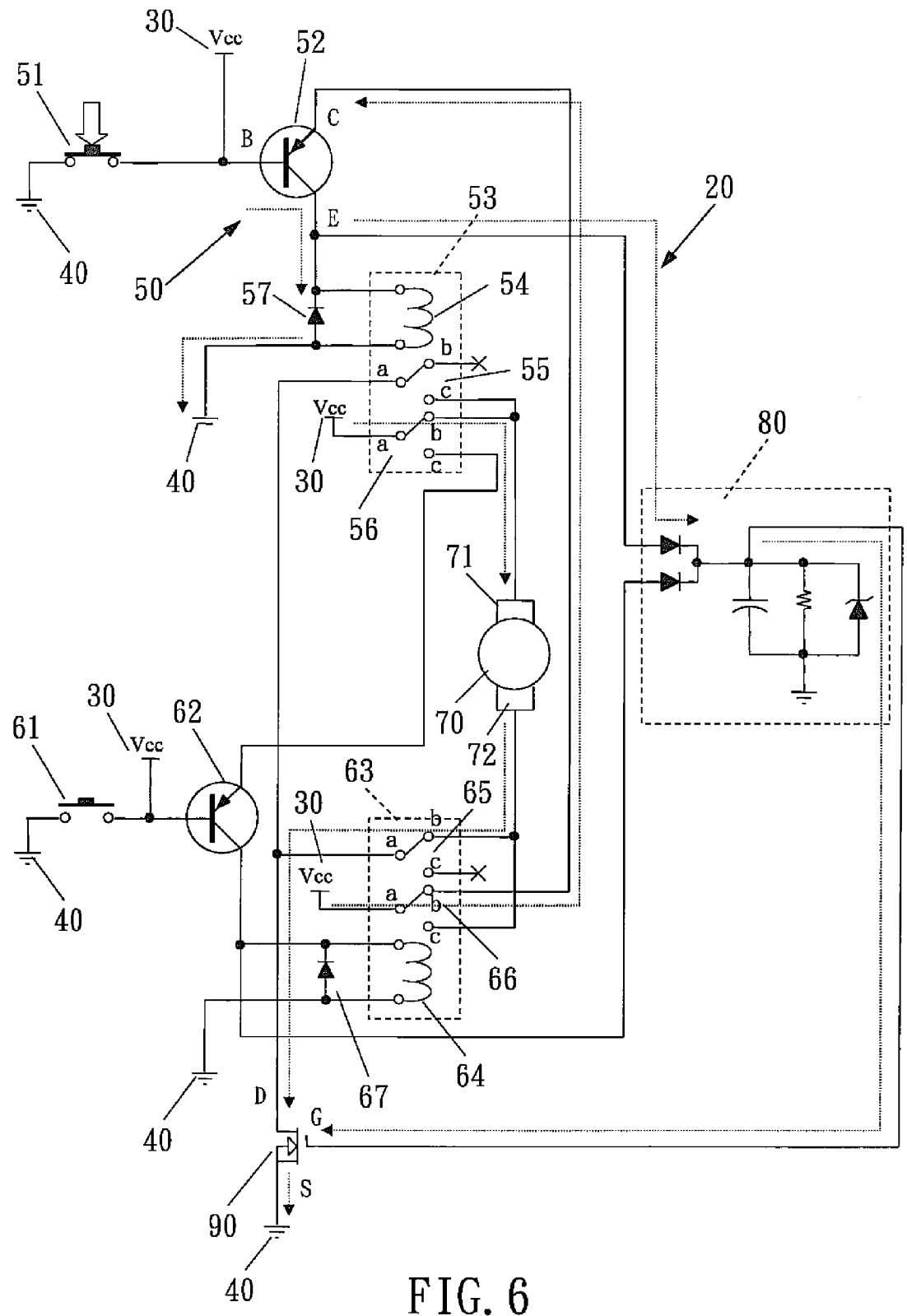
FIG. 6 is a circuit diagram of the interlocking device used together with a power-supply delay circuit and a delay switch is operated in the clockwise rotation state in accordance with the present invention.
Figure 7:
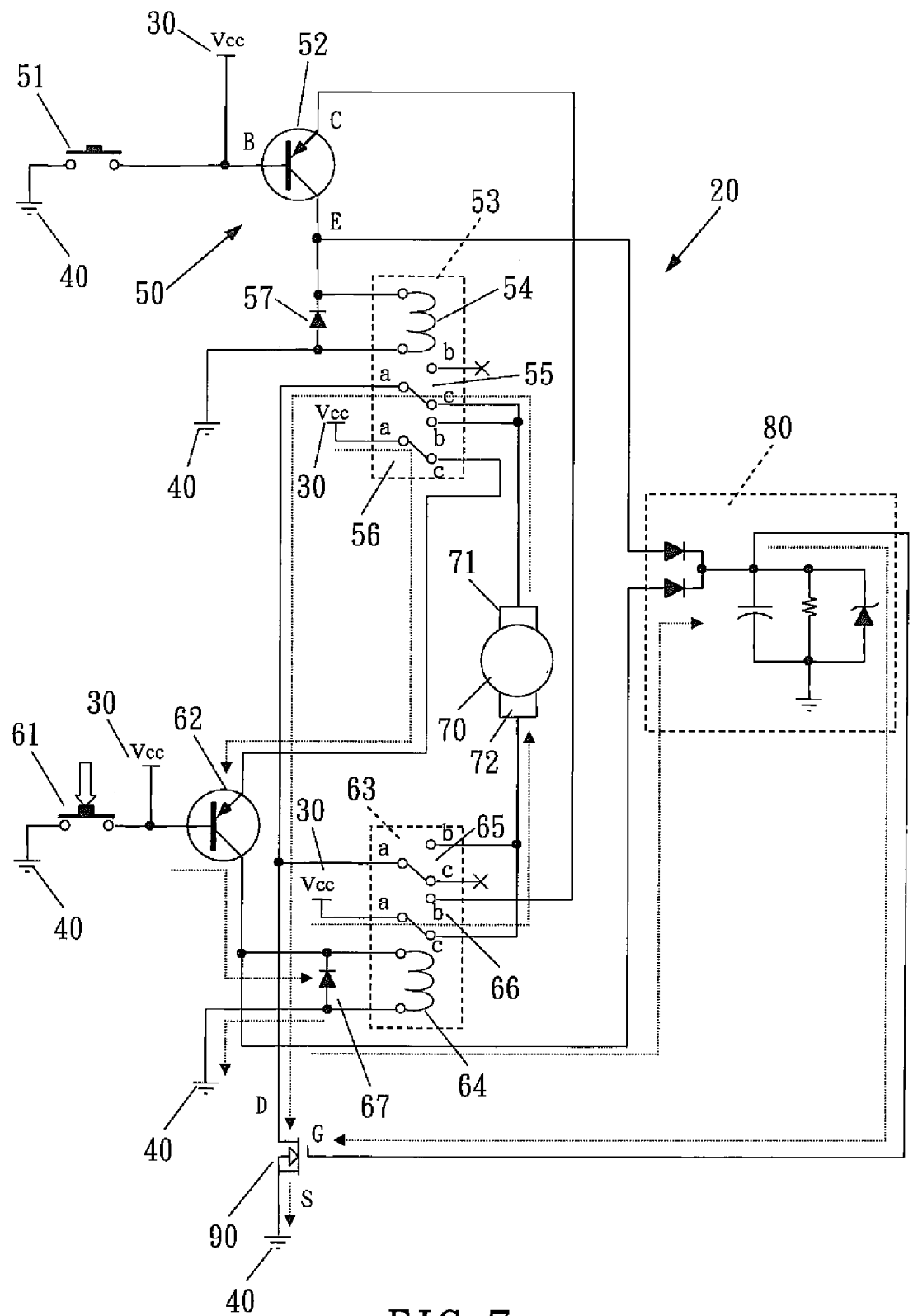
FIG. 7 is a circuit diagram of the interlocking device used together with a power-supply delay circuit and a delay switch is operated in the counterclockwise rotation state in accordance with the present invention.

Referring to FIGS. 5-7, the interlocking device 20 electrifies the coil 54 of the clockwise rotation relay 53 during the clockwise rotation of the clockwise rotation module 50, and electrifies the coil 64 of the counterclockwise rotation relay 63 during the counterclockwise rotation of the counterclockwise rotation module 60. By such arrangements, the coil 54 of the clockwise rotation relay 53 and the coil 64 of the counterclockwise rotation relay 63 utilize the diodes 56, 57 to waste energy respectively, thus avoiding being damaged.

Referring to FIGS. 5-7, the power-supply delay circuit 80 of the interlocking device 20 will receive the power from the clockwise rotation trigger switch 52 of the clockwise rotation module 50 during the clockwise rotation, and will receive the power from the counterclockwise rotation trigger switch 62 of the counterclockwise rotation module 60 during the counterclockwise rotation. By such arrangements, the interlocking device 20 can utilize the delay switch 90 to receive the delayed power from the power-supply delay circuit 80 to cause a delayed operation, so as to provide the protection to the clockwise rotation relay 53 of the clockwise rotation module 50 and the counterclockwise rotation relay 63 of the counterclockwise rotation module 60, respectively.

To summarize, the present invention relates to an interlocking device for controlling clockwise and counterclockwise rotation of a motor. The interlocking device is connected with a clockwise rotation module and a counterclockwise rotation module at both ends thereof to form a loop by cooperating with a power-supply terminal and an earth terminal. The clockwise rotation module includes a clockwise rotation trigger switch and a clockwise rotation relay. The counterclockwise rotation module includes a counterclockwise rotation trigger switch and a counterclockwise rotation relay. By such arrangements, the loop collision caused by mis-touch can be avoided by a cross connection of the clockwise and counterclockwise rotation relays with the clockwise and counterclockwise rotation trigger switches, thus preventing the man-made careless mistake and maintaining the smoothness of the operation.

While we have shown and described various embodiments in accordance with the present invention, it is clear to those skilled in the art that further embodiments may be made without departing from the scope of the present invention.

What is claimed is:

1. An interlocking device for controlling clockwise and counterclockwise rotation of a motor comprising:

a power-supply terminal;

an earth terminal;

a clockwise rotation module including a clockwise rotation switch, a clockwise rotation trigger switch and a clockwise rotation relay, the clockwise rotation switch being connected with the power-supply terminal and the earth terminal respectively, and the clockwise rotation relay being connected with the clockwise rotation trigger switch and the earth terminal, respectively;

a counterclockwise rotation module including a counterclockwise rotation switch, a counterclockwise rotation trigger switch and a counterclockwise rotation relay, the counterclockwise rotation switch being connected with the power-supply terminal and the earth terminal, respectively, the counterclockwise rotation trigger switch being connected with the counterclockwise rotation switch, the counterclockwise rotation trigger switch being connected with the clockwise rotation relay of the clockwise rotation module, the counterclockwise rotation relay being connected with the counterclockwise rotation trigger switch and the earth terminal, respectively, the counterclockwise rotation relay being connected with the clockwise rotation trigger switch of the clockwise rotation module; and a motor being electrically connected with the clockwise rotation relay and the counterclockwise rotation relay, respectively, by cooperating a cross connection of the clockwise and counterclockwise rotation relays with the clockwise and counterclockwise rotation trigger switch, the clockwise and counterclockwise rotation switch with the power-supply terminal and the earth terminal, a clockwise and counterclockwise rotation interlocking operation of the motor is controlled by the clockwise and counterclockwise rotation switches.

2. The interlocking device for controlling clockwise and counterclockwise rotation of a motor as claimed in claim 1, wherein the clockwise rotation relay includes a coil, a first switch element and a second switch element, one end of the coil is connected to the clockwise rotation trigger switch, and the other end of the coil is connected to the earth terminal, the first switch element includes a contact a, a contact b and a contact c, the contact a of the first switch element is connected with the earth terminal, the contact b of the first switch element is not used herein, the second switch element includes a contact a, a contact b and a contact c, the contact a of the second switch element is connected with the power-supply terminal, and the contact b of the second switch element is connected with the contact c of the first switch element.

3. The interlocking device for controlling clockwise and counterclockwise rotation of a motor as claimed in claim 1, wherein the counterclockwise rotation relay includes a coil, a first switch element and a second switch element, one end of the coil is connected to the counterclockwise rotation trigger switch, and the other end of the coil is connected to the earth terminal, the first switch element includes a contact a, a contact b and a contact c, the contact a of the first switch element is connected with the earth terminal, the contact c of the first switch element is not used herein, the second switch element includes a contact a, a contact b and a contact c, the contact a of the second switch element is connected with the power-supply terminal, the contact b of the second switch element is connected with the clockwise rotation trigger switch, and the contact c of the second switch element is the contact b of the first switch element.

4. The interlocking device for controlling clockwise and counterclockwise rotation of a motor as claimed in claim 1, wherein the interlocking device includes a diode connected with the clockwise rotation relay of the clockwise rotation module.

5. The interlocking device for controlling clockwise and counterclockwise rotation of a motor as claimed in claim 1, wherein the interlocking device further includes a diode connected with the counterclockwise rotation relay of the counterclockwise rotation module.

6. The interlocking device for controlling clockwise and counterclockwise rotation of a motor as claimed in claim 1, wherein the interlocking device further includes a power-supply delay circuit and a delay switch, the power-supply circuit is connected with the clockwise rotation trigger switch of the clockwise rotation module and the counterclockwise rotation trigger switch of the counterclockwise rotation module, respectively, the delay switch is connected with the clockwise rotation relay of the clockwise module, the counterclockwise rotation relay of the counterclockwise rotation module, the power-supply delay circuit and the earth terminal, respectively.

7. The interlocking device for controlling clockwise and counterclockwise rotation of a motor as claimed in claim 6, wherein the delay switch is a metal oxide semiconductor field effect transistor.

8. The interlocking device for controlling clockwise and counterclockwise rotation of a motor as claimed in claim 1, wherein the clockwise rotation trigger switch of the clockwise rotation module is a bipolar junction transistor.

9. The interlocking device for controlling clockwise and counterclockwise rotation of a motor as claimed in claim 1, wherein the counterclockwise rotation trigger switch of the counterclockwise rotation module is a bipolar junction transistor.

* * * * *